(12) United States Patent
Chan et al.

(10) Patent No.: US 11,002,440 B1
(45) Date of Patent: May 11, 2021

(54) LIGHT SOURCE MODULE AND ELECTRONIC DEVICE WITH SAME

(71) Applicant: Primax Electronics Ltd., Taipei (TW)

(72) Inventors: Wei-Ping Chan, Taipei (TW);
Wei-Chiang Huang, Taipei (TW);
Chuan-Tai Hsiao, Taipei (TW);
Xiu-Mei Pan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/940,116

(22) Filed: Jul. 27, 2020

Related U.S. Application Data

(60) Provisional application No. 62/959,057, filed on Jan. 9, 2020.

(51) Int. Cl.
*F21V 23/00* (2015.01)
*F21V 33/00* (2006.01)
*F21V 23/06* (2006.01)
*F21Y 115/10* (2016.01)

(52) U.S. Cl.
CPC ............ *F21V 23/002* (2013.01); *F21V 23/06* (2013.01); *F21V 33/0052* (2013.01); *F21Y 2115/10* (2016.08)

(58) Field of Classification Search
CPC .... F21V 23/002; F21V 23/06; F21V 33/0052; F21Y 2115/10
USPC .......................................................... 362/234
See application file for complete search history.

(56) References Cited

U.S. PATENT DOCUMENTS

| | | | | |
|---|---|---|---|---|
| 2003/0206408 | A1* | 11/2003 | Funamoto ............ | G02B 6/0043 362/603 |
| 2007/0279944 | A1* | 12/2007 | Sakai .................... | G02B 6/0031 362/633 |
| 2010/0033125 | A1* | 2/2010 | Yamada .................. | H04M 1/21 320/101 |
| 2010/0155575 | A1* | 6/2010 | Lundin ................. | G06F 3/0202 250/206 |
| 2018/0052275 | A1* | 2/2018 | Lee ......................... | H01L 33/62 |
| 2019/0024858 | A1* | 1/2019 | Kim ......................... | F21S 4/28 |

* cited by examiner

*Primary Examiner* — Anabel Ton
(74) *Attorney, Agent, or Firm* — Kirton McConkie; Evan R. Witt

(57) ABSTRACT

A light source module includes a transparent conductive substrate and plural light source groups. The transparent conductive substrate includes a substrate base, plural positive electrodes, plural negative electrodes and plural gaps. The plural positive electrodes and the plural negative electrodes are installed on the substrate base. Each light source group includes plural light-emitting elements. The plural positive electrodes are separately arranged. Consequently, the resistances of the light-emitting elements are substantially equal.

8 Claims, 3 Drawing Sheets

LIGHT SOURCE MODULE AND ELECTRONIC DEVICE WITH SAME

CROSS-REFERENCE TO RELATED APPLICATION

This application claims priority to U.S. Provisional Patent Application No. 62/959,057 filed Jan. 9, 2020, the contents of which are incorporated herein by reference.

FIELD OF THE INVENTION

The present invention relates to a light source module, and more particularly to a light source module with plural light-emitting elements.

BACKGROUND OF THE INVENTION

Recently, electronic devices with slim appearance are favored by users because they are easily carried. In addition to the slim appearance, electronic devices can provide sound and light effects. Consequently, users pay much attention to the electronic devices. For example, a computer host for electronic sports is usually equipped with a light source module. When the light source module is driven to emit plural light beams, the computer host for electronic sports generates a luminous effect. Moreover, the light source module needs to have a slim structure.

The structure of a conventional light source module will be described as follows. FIG. 1 is a schematic top view illustrating the structure of a conventional light source module. As shown in FIG. 1, the conventional light source module 1 comprises a transparent conductive substrate 11, plural light source groups 12 and a conductive member 13.

The transparent conductive substrate 11 comprises a substrate base 111, plural positive electrodes 112, plural negative electrodes 113, plural gaps 114 and an extension part 115. The plural positive electrodes 112 are installed on the substrate base 111. The plural negative electrodes 113 are also installed on the substrate base 111. Each plural negative electrode 113 is aligned with and located near the corresponding positive electrode 112. Each gap 114 is aligned with the corresponding positive electrode 112 and the corresponding negative electrode 113. Moreover, each gap 114 is arranged between the corresponding positive electrode 112 and the corresponding negative electrode 113. That is, the plural positive electrodes 112 and the plural negative electrodes 113 are separated from each other through the plural gaps 114. The plural positive electrodes 112 are connected with each other through the extension part 115.

Each light source group 12 is aligned with one corresponding gap 114 and installed on the corresponding gap 114. Moreover, each light source group 12 comprises plural light-emitting elements 121, 122 and 123, which are arranged in a row. The plural light-emitting elements 121, 122 and 123 are installed on the corresponding gap 114 and electrically connected with the corresponding positive electrode 112 and the corresponding negative electrode 113. The conductive member 13 is electrically connected with the plural positive electrodes 112 and the plural negative electrodes 113. Moreover, the conductive member 13 is electrically connected with an external power source 10 to acquire electric power from the external power source 10. Moreover, the electric power is transmitted to the light-emitting elements 121, 122 and 123 of the plural light source group 12 through the plural positive electrodes 112 and the plural negative electrodes 113. Consequently, the light-emitting elements 121, 122 and 123 emit light beams.

However, the wiring design still has some drawbacks. For example, since the path distances of the currents flowing through the light-emitting elements 121, 122 and 123 are different, the resistance values of the light-emitting elements 121, 122 and 123 are different. For example, the light beams emitted by the light-emitting element 121 are brighter, and the light beams emitted by the light-emitting element 123 are darker. Consequently, the luminance of the conventional light source module is not uniform. Moreover, since the resistance values of the light-emitting elements 121, 122 and 123 are different, the light beams emitted by the light-emitting elements 121, 122 and 123 result in a flickering effect.

Therefore, there is a need of providing an improved light source module to provide the uniform luminance and avoid the flickering effect.

SUMMARY OF THE INVENTION

An object of the present invention provides a light source module capable of providing the uniform luminance and avoiding the flickering effect.

Another object of the present invention provides an electronic device capable of providing the uniform luminance and avoiding the flickering effect.

In accordance with an aspect of the present invention, a light source module is provided. The light source module includes a transparent conductive substrate and plural light source groups. The transparent conductive substrate includes a substrate base, plural positive electrodes, plural negative electrodes and plural gaps. The plural positive electrodes are installed on the substrate base, the plural negative electrodes are installed on the substrate base. The plural gaps are arranged between the corresponding positive electrodes and the corresponding negative electrodes. Consequently, the corresponding positive electrodes and the corresponding negative electrodes are separated from each other by the plural gaps. The plural light source groups are aligned with and installed on the corresponding gaps. Each light source group is electrically connected with the corresponding positive electrode and the corresponding negative electrode to emit plural light beams.

In an embodiment, the light source module further includes a conductive member, and the conductive member is electrically connected with the plural positive electrodes and the plural negative electrodes. The conductive member acquires electric power from an external power source and provides the electric power to the plural light source groups through the plural positive electrodes and the plural negative electrodes. For example, the conductive member is a flexible printed circuit board (FPC) or a flexible flat cable (FFC).

In an embodiment, each light source group comprises plural light-emitting elements, which are arranged in a row. The plural light-emitting elements of each light source group are arranged on the corresponding gap and electrically connected with the corresponding positive electrode and the corresponding negative electrode to emit the light beams. Moreover, the plural positive electrodes are separately arranged and not electrically connected with each other, and the plural negative electrodes are separately arranged and not electrically connected with each other.

In accordance with another aspect of the present invention, an electronic device is provided. The electronic device includes a casing and a light source module. The casing is exposed outside the electronic device. The light source module is installed on the casing. The light source module includes a transparent conductive substrate and plural light source groups. The transparent conductive substrate includes a substrate base, plural positive electrodes, plural negative electrodes and plural gaps. The plural positive electrodes are installed on the substrate base, the plural negative electrodes are installed on the substrate base. The plural gaps are arranged between the corresponding positive electrodes and the corresponding negative electrodes. Consequently, the corresponding positive electrodes and the corresponding negative electrodes are separated from each other by the plural gaps. The plural light source groups are aligned with and installed on the corresponding gaps. Each light source group is electrically connected with the corresponding positive electrode and the corresponding negative electrode to emit plural light beams. Consequently, the casing provides a luminous effect.

From the above descriptions, the present invention provides the light source module and the electronic device with the light source module. In the light source module, the plural positive electrodes are separately arranged, and the plural negative electrodes are separately arranged. Consequently, the path distances of the currents flowing through the light-emitting elements are substantially equal. That is, the resistance values of the light-emitting elements are substantially equal. Since luminance values of the light-emitting elements are very close, the luminance of the light source module is very uniform. Moreover, since the plural positive electrodes are separately arranged and the plural negative electrodes are separately arranged, the plural positive electrodes and the plural negative electrodes can be electrically connected with the conductive member and the driving circuit individually. Since the positive electrodes and the negative electrodes for different light-emitting elements are independent and not interfered, the flicking problem of the conventional technology can be overcome.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
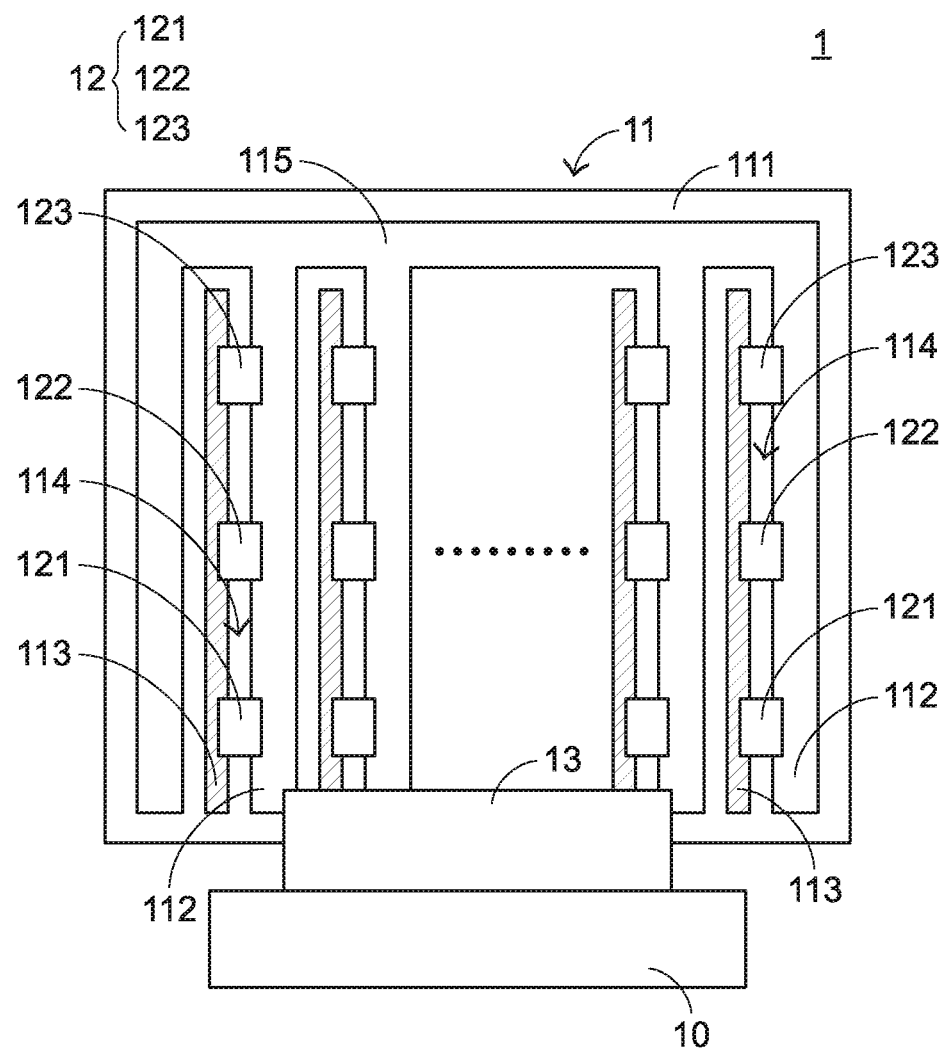
FIG. 1 is a schematic top view illustrating the structure of a conventional light source module.

The present invention provides a light source module in order to overcome the drawbacks of the conventional technologies. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
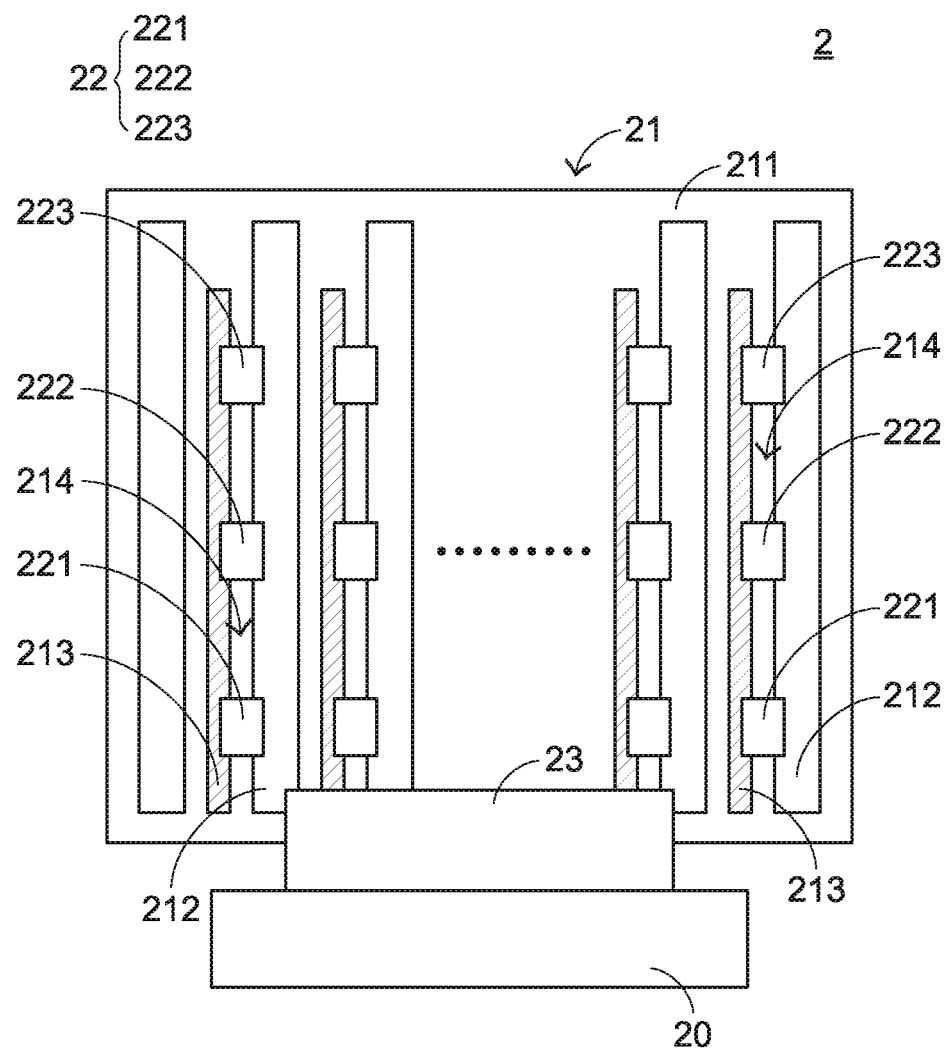
FIG. 2 is a schematic top view illustrating the structure of a light source module according to an embodiment of the present invention.

FIG. 2 is a schematic top view illustrating the structure of a light source module according to an embodiment of the present invention. As shown in FIG. 2, the light source module 2 comprises a transparent conductive substrate 21, plural light source groups 22 and a conductive member 23.

The transparent conductive substrate 21 comprises a substrate base 211, plural positive electrodes 212, plural negative electrodes 213 and plural gaps 214. The plural positive electrodes 212 are installed on the substrate base 211. The plural negative electrodes 213 are also installed on the substrate base 211. Each negative electrode 213 is aligned with and located near the corresponding positive electrode 212. Each gap 214 is aligned with the corresponding positive electrode 212 and the corresponding negative electrode 213. Moreover, each gap 214 is arranged between the corresponding positive electrode 212 and the corresponding negative electrode 213. That is, the plural positive electrodes 212 and the plural negative electrodes 213 are separated from each other through the plural gaps 214. In accordance with a feature of the present invention, the plural positive electrodes 212 are separately arranged and not electrically connected with each other. Moreover, the plural negative electrodes 213 are separately arranged and not electrically connected with each other.

As shown in FIG. 2, each light source group 22 is aligned with one corresponding gap 214 and installed on the corresponding gap 214. Moreover, each light source group 22 comprises plural light-emitting elements 221, 222 and 223, which are arranged in a row. The plural light-emitting elements 221, 222 and 223 are installed on the corresponding gap 214 and electrically connected with the corresponding positive electrode 212 and the corresponding negative electrode 213. The conductive member 23 is electrically connected with the plural positive electrodes 212 and the plural negative electrodes 213. Moreover, the conductive member 23 is electrically connected with an external power source 20 to acquire electric power from the external power source 20. Moreover, the electric power is transmitted to the light-emitting elements 221, 222 and 223 of the plural light source group 22 through the plural positive electrodes 212 and the plural negative electrodes 213. Consequently, the light-emitting elements 221, 222 and 223 emit light beams.

In an embodiment, the light-emitting elements 221, 222 and 223 are micro light emitting diodes (Micro LEDs) or mini light emitting diodes (Mini LED), and the conductive member 23 is a flexible printed circuit board (FPC) or a flexible flat cable (FFC). It is noted that the examples of the light-emitting elements and the conductive member are not restricted.

Since the plural negative electrodes 213 are separately arranged, the path distances of the currents flowing through the light-emitting elements 221, 222 and 223 are substantially equal. That is, the resistance values of the light-emitting elements 221, 222 and 223 are substantially equal. Since luminance values of the light-emitting elements 221, 222 and 223 are very close, the luminance of the light source module 2 is very uniform.

Figure 3:
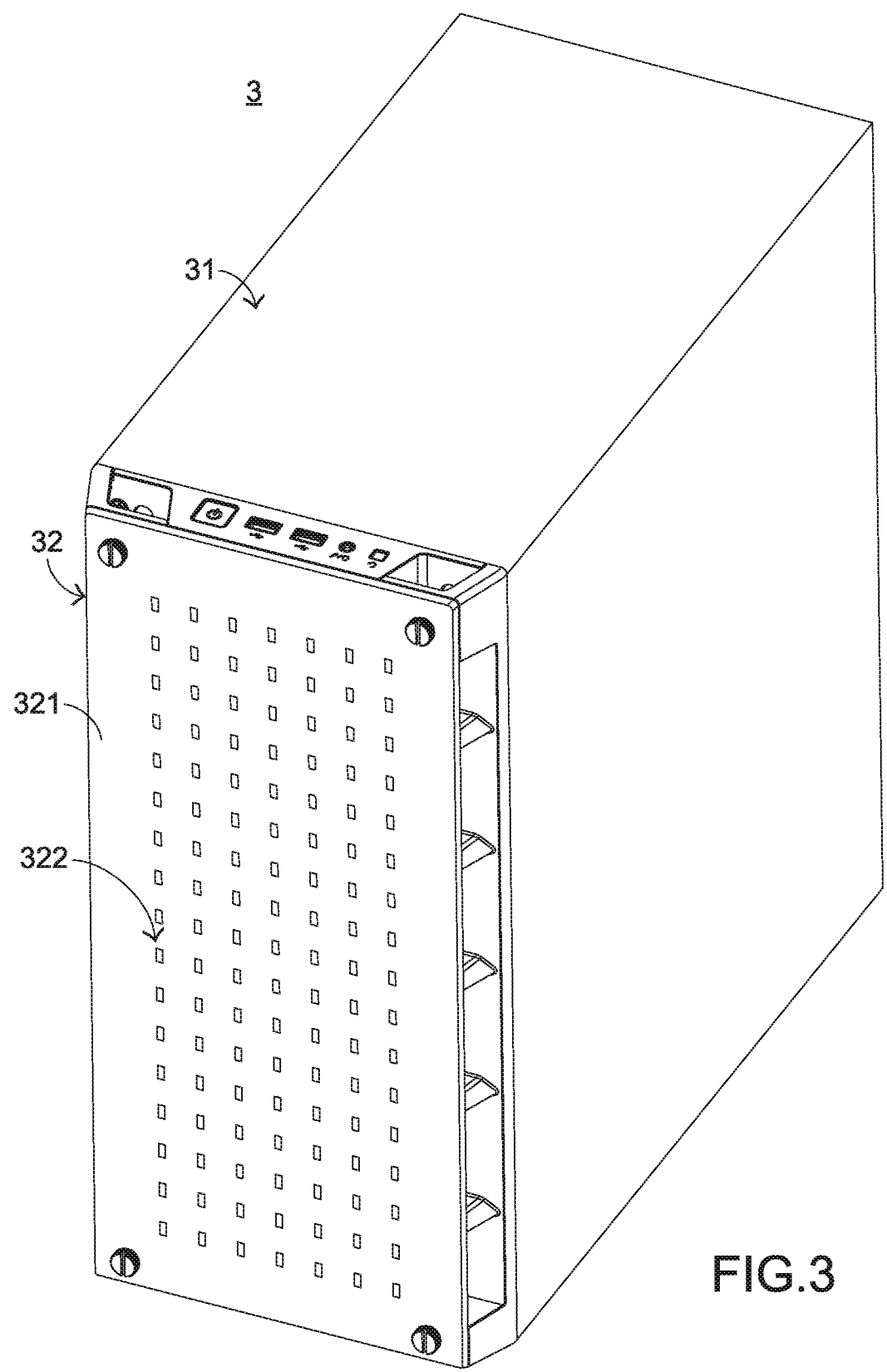
FIG. 3 is a schematic view illustrating a portion of an electronic device with a light source module according to a second embodiment of the present invention.

The present invention further provides another embodiment. FIG. 3 is a schematic view illustrating a portion of an electronic device with a light source module according to a second embodiment of the present invention. The electronic device 3 comprises a casing 31 and a light source module 32. The casing 31 is exposed outside the electronic device 3. The light source module 32 is installed on the casing 31. The light source module 32 comprises a transparent conductive substrate 321 and plural light source groups 322. The transparent conductive substrate 321 comprises a substrate base (not shown), plural positive electrodes (not shown), plural negative electrodes (not shown) and plural gaps (not shown). The structure and the operation of the light source module 32 are similar to those of the first embodiment, and not redundantly described herein. When the light source module 32 is enabled, the light source module 32 emits light beams. Consequently, the casing 31 of the electronic device 3 provides the uniform luminous effect.

From the above descriptions, the present invention provides the light source module and the electronic device with the light source module. In the light source module, the plural positive electrodes are separately arranged, and the plural negative electrodes are separately arranged. Consequently, the path distances of the currents flowing through the light-emitting elements are substantially equal. That is, the resistance values of the light-emitting elements are substantially equal. Since luminance values of the light-emitting elements are very close, the luminance of the light source module is very uniform. Moreover, since the plural positive electrodes are separately arranged and the plural negative electrodes are separately arranged, the plural positive electrodes and the plural negative electrodes can be electrically connected with the conductive member and the driving circuit individually. Since the positive electrodes and the negative electrodes for different light-emitting elements are independent and not interfered, the flicking problem of the conventional technology can be overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation to encompass all such modifications and similar structures.

What is claimed is:

1. A light source module, comprising:
   a transparent conductive substrate comprising a substrate base, plural positive electrodes, plural negative electrodes and plural gaps, wherein the plural positive electrodes are installed on the substrate base, the plural negative electrodes are installed on the substrate base, and the plural gaps are arranged between the corresponding positive electrodes and the corresponding negative electrodes, so that the corresponding positive electrodes and the corresponding negative electrodes are separated from each other by the plural gaps, wherein the plural positive electrodes are separately arranged and not electrically connected with each other, and the plural negative electrodes are separately arranged and not electrically connected with each other; and
   plural light source groups aligned with and installed on the corresponding gaps, wherein each light source group is electrically connected with the corresponding positive electrode and the corresponding negative electrode to emit plural light beams.

2. The light source module according to claim 1, wherein the light source module further comprises a conductive member, and the conductive member is electrically connected with the plural positive electrodes and the plural negative electrodes, wherein the conductive member acquires electric power from an external power source and provides the electric power to the plural light source groups through the plural positive electrodes and the plural negative electrodes.

3. The light source module according to claim 2, wherein the conductive member is a flexible printed circuit board (FPC) or a flexible flat cable (FFC).

4. The light source module according to claim 1, wherein each light source group comprises plural light-emitting elements, which are arranged in a row, wherein the plural light-emitting elements of each light source group are arranged on the corresponding gap and electrically connected with the corresponding positive electrode and the corresponding negative electrode to emit the light beams.

5. An electronic device, comprising:
   a casing exposed outside the electronic device; and
   a light source module installed on the casing, and comprising:
      a transparent conductive substrate comprising a substrate base, plural positive electrodes, plural negative electrodes and plural gaps, wherein the plural positive electrodes are installed on the substrate base, the plural negative electrodes are installed on the substrate base, and the plural gaps are arranged between the corresponding positive electrodes and the corresponding negative electrodes, so that the corresponding positive electrodes and the corresponding negative electrodes are separated from each other by the plural gaps, wherein the plural positive electrodes are separately arranged and not electrically connected with each other, and the plural negative electrodes are separately arranged and not electrically connected with each other; and
      plural light source groups aligned with and installed on the corresponding gaps, wherein each light source group is electrically connected with the corresponding positive electrode and the corresponding negative electrode to emit plural light beams, so that the casing provides a luminous effect.

6. The electronic device according to claim 5, wherein the electronic device further comprises a conductive member, and the conductive member is electrically connected with the plural positive electrodes and the plural negative electrodes, wherein the conductive member acquires electric power from an external power source and provides the electric power to the plural light source groups through the plural positive electrodes and the plural negative electrodes.

7. The electronic device according to claim 6, wherein the conductive member is a flexible printed circuit board (FPC) or a flexible flat cable (FFC).

8. The electronic device according to claim 5, wherein each light source group comprises plural light-emitting elements, which are arranged in a row, wherein the plural light-emitting elements of each light source group are arranged on the corresponding gap and electrically connected with the corresponding positive electrode and the corresponding negative electrode to emit the light beams.

* * * * *